UNITED STATES PATENT OFFICE.

GEORGE WASHINGTON REAMER, OF FOREST HILL, CALIFORNIA.

METHOD OF PREPARING FIGS.

SPECIFICATION forming part of Letters Patent No. 474,099, dated May 3, 1892.

Application filed October 12, 1891. Serial No. 408,507. (No specimens.)

*To all whom it may concern:*

Be it known that I, GEORGE WASHINGTON REAMER, a citizen of the United States, residing at Forest Hill, Placer county, State of California, have invented an Improvement in Methods of Preparing Figs; and I hereby declare the following to be a full, clear, and exact description of the same.

My invention relates to the art of preparing food products.

It consists, essentially, in the novel process, mode, or method hereinafter described and claimed of preparing figs whereby they are reduced to a condition adapting them for subsequent manipulation.

It also consists in connection with said preparation of certain subsequent steps or manipulations which form the complete commercial product or article of manufacture.

The object of my invention is to provide a fig product with flavor unimpaired, having lasting qualities, easily handled for commerce, ready for use by the housekeeper, and forming a laxative food easily obtainable.

In carrying out my process I take the ordinary uncooked dried figs of commerce. These are usually hard, dry, and covered with the fiber of the casing in which they are packed and are otherwise dirty. I first remove the stems and other hard bits and portions, such as are usually found at the blossom ends. I then subject them to the action of steam for a short period—say from five to eight minutes. This may be done in any suitable manner, as by the use of an ordinary steamer, consisting of a perforated vessel and a water-containing vessel in which the perforated vessel is placed. The effect of this steaming is twofold. It both cleans and softens the figs. It is an essential step, for both effects are necessary. The figs must be both cleaned and softened. Care must be taken not to leave them in the steamer too long, for their strength and virtue are impaired thereby. After steaming I then subject them to a dry heat. This heat should be just sufficient to obtain the required effect—namely, to cause the exudation of the juice from the figs. The juice oozes out through the skin over its entire surface and coats it over with about the consistency of thin molasses. This heat should be continued for from five to ten minutes, care being taken to avoid an overexposure to the heat. This can be determined by observing the amount of juice exuded, which should be just sufficient to coat the fig thinly. The remainder of the juice should be kept in the fig to avoid exhaustion.

The required heat can be readily obtained from the partially-heated oven of a stove in which the figs may be placed in a suitable vessel. These two steps—namely, the steaming and the dry heating—constitute the essential operation in the preparation of the figs, whereby they are reduced to a condition in which they can be subsequently manipulated. Herein lies the chief novelty in my invention, for by these steps I can utilize the dry hard uncooked figs for the subsequent preparation of a solid-food product or a liquid molasses-like product. Each step is essential. The steaming alone would not effect the result, as the juice would be too thin and the body of the fig would crumble and not hold together. The heating alone would not clean them, and the resulting product would be too friable. Now, having steamed and dry-heated the figs, as described, I subject them to an expressing and straining operation, whereby the figs are reduced to a consistent mass and some of the juice removed from the mass. This can be done in any suitable manner, as by forcing the figs through a strainer, the holes of which are comparatively small. This operation may be repeated as often as desired. In practice I repeat it once. This has the effect of making the mass of a fine adherent consistency. The juice expressed is a muddy-like liquid, not very thick. It can be boiled and reduced to a molasses-like liquid, stopping the boiling just short of candying. Some of the boiled juice, in cases where a richer product is desired and one which dries more readily, can be added to and mixed with the fig mass after the straining operation. The product is richer and more pliable, and the juice tending to granulate renders the product when formed into strips less sticky. The consistent and adhering fig mass is then divided and suitably shaped in ribbons, strips, or pieces of suitable size. This may be done by forcing it through proper-shaped slots; or it may be molded. The resultant product is a flexible mass, not sticky, easy to cut, easy to masticate, with its full flavor preserved, clean, and lasting. It can be easily handled and packed. It is not candied, but is rich and in the mouth is juicy and sweet. In the household it can be used as a laxative, or in cooking by cutting it up and adding it to a thin sirup for sauces, &c.; or it can be eaten for pleasure, being more grateful than dried figs.

Having thus described my invention, what I claim as new, and desire to secure by Letters Patent, is—

1. The process of preparing figs for food products, which consists in first subjecting the dried uncooked figs to the action of steam to soften and clean them and then in subjecting them to a dry heat just sufficient to cause an exudation of juice, substantially as herein described.

2. The process of preparing figs for food products, which consists in first subjecting the dried uncooked figs to the action of steam to soften and clean them, then subjecting them to a dry heat just sufficient to cause an exudation of juice, and then subjecting them to an expressing and straining operation to obtain a portion of the juice and reduce the figs to a consistent mass, substantially as herein described.

3. The process of making a fig product, which consists in subjecting the dried uncooked figs to the action of steam to soften and clean them, then subjecting them to a dry heat just sufficient to cause an exudation of juice, then subjecting them to a straining operation to reduce them to a consistent mass, and finally dividing and forming the mass into suitable shapes, substantially as herein described.

4. The process of making a fig product, which consists in subjecting the dried uncooked figs to the action of steam to soften and clean them, then subjecting them to a dry heat just sufficient to cause an exudation of juice, then subjecting them to an expressing and straining operation to obtain a portion of the juice and reduce the figs to a consistent mass, then adding to the mass a portion of the boiled juice, and finally dividing and forming the mass into suitable shapes, substantially as herein described.

In witness whereof I have hereunto set my hand.

GEORGE WASHINGTON REAMER.

Witnesses:
S. H. NOURSE,
J. A. BAYLESS.